United States Patent
Liang et al.

(10) Patent No.: US 10,581,742 B2
(45) Date of Patent: Mar. 3, 2020

(54) CONGESTION CONTROL METHOD AND NETWORK NODE

(71) Applicant: Huawei Technologies Co., Ltd., Shenzhen (CN)

(72) Inventors: Wei Liang, Shenzhen (CN); Gong Zhang, Shenzhen (CN); Guanrong Chen, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 15/870,104

(22) Filed: Jan. 12, 2018

(65) Prior Publication Data

US 2018/0139135 A1     May 17, 2018

Related U.S. Application Data

(63) Continuation of application No. PCT/CN2016/071596, filed on Jan. 21, 2016.

(30) Foreign Application Priority Data

Jul. 13, 2015     (CN) .......................... 2015 1 0409654

(51) Int. Cl.
*H04L 12/801* (2013.01)
*H04L 12/835* (2013.01)
*H04L 12/863* (2013.01)

(52) U.S. Cl.
CPC ............... *H04L 47/12* (2013.01); *H04L 47/11* (2013.01); *H04L 47/30* (2013.01); *H04L 47/50* (2013.01); *H04L 47/193* (2013.01); *H04L 47/37* (2013.01)

(58) Field of Classification Search
CPC ......... H04L 47/12; H04L 47/30; H04L 47/11; H04L 47/50; H04L 47/37; H04L 47/193; H04L 47/122; H04L 47/125; H04L 49/90
See application file for complete search history.

(56) References Cited

U.S. PATENT DOCUMENTS

| | | | |
|---|---|---|---|
| 6,169,727 B1 | 1/2001 | Song | |
| 2003/0179774 A1* | 9/2003 | Saidi | ..................... H04L 47/522 370/468 |

(Continued)

FOREIGN PATENT DOCUMENTS

| | | |
|---|---|---|
| CN | 101018195 A | 8/2007 |
| CN | 101056259 A | 10/2007 |

(Continued)

OTHER PUBLICATIONS

Chen et al., "Cloud Computing-Based Service Providing Method and Device", May 28, 2014, Chines Patent Office, CN103825940, English machine language translation. (Year: 2014).*

(Continued)

*Primary Examiner* — Paul H Masur
*Assistant Examiner* — Michael K Phillips
(74) *Attorney, Agent, or Firm* — Conley Rose, P.C.

(57) ABSTRACT

A congestion control method includes obtaining, by a first network node, a current queue buffer status of each of N second network nodes, combining, by the first network node, current queue buffer statuses of the N second network nodes and a current queue buffer status of the first network node into a state vector, updating, by the first network node, the current queue buffer status of the first network node according to the state vector and a coupling vector; and repeating all the above steps till an absolute value of a difference between each of the queue buffer statuses of the N second network nodes and the queue buffer status of the first network node is less than or equal to a preset threshold.

18 Claims, 3 Drawing Sheets

(56) References Cited

U.S. PATENT DOCUMENTS

| | | | |
|---|---|---|---|
| 2011/0299389 A1* | 12/2011 | Mau | H04L 47/11 370/230 |
| 2014/0140212 A1 | 5/2014 | Morandin | |

FOREIGN PATENT DOCUMENTS

| | | |
|---|---|---|
| CN | 101119281 A | 2/2008 |
| CN | 101179473 A | 5/2008 |
| CN | 101399746 A | 4/2009 |
| CN | 101640895 A | 2/2010 |
| CN | 102065000 A | 5/2011 |
| CN | 103414650 A | 11/2013 |
| CN | 103546530 A | 1/2014 |
| CN | 103795643 A | 5/2014 |
| CN | 103825840 A | 5/2014 |
| CN | 104506369 A | 4/2015 |
| EP | 2187576 B1 | 11/2013 |

OTHER PUBLICATIONS

Raiciu et al.; "Coupled Congestion Control for Multipath Transport Protocols", Oct. 2011, IETF, RFC 6356. (Year: 2011).*
Raicu et al.; "Practical Congestion Control for Multipath Transport Protocols", 2010, University College London . (Year: 2010).*
Wischik et al., "Design, Implementation and Evaluation of Congestion Control for Multipath TCP", 2011, Proceedings of USENIX Conference on Networked Systems Design and Implementation, NSDI. (Year: 2011).*
Machine Translation and Abstract of Chinese Publication No. CN101179473, May 14, 2008, 11 pages.
Machine Translation and Abstract of Chinese Publication No. CN102065000, May 18, 2011, 17 pages.
Machine Translation and Abstract of Chinese Publication No. CN103414650, Nov. 27, 2013, 76 pages.
Machine Translation and Abstract of Chinese Publication No. CN103546530, Jan. 29, 2014, 26 pages.
Machine Translation and Abstract of Chinese Publication No. CN103795643, May 14, 2014, 17 pages.
Machine Translation and Abstract of Chinese Publication No. CN103825940, May 28, 2014, 18 pages.
Floyd, S., et al., "The Synchronization of Periodic Routing Messages," IEEE/ACM Transactions on Networking, vol. 2, No. 2, Apr. 1994, pp. 122-136.
Foreign Communication From a Counterpart Application, International Application No. PCT/CN2016/071596, English Translation of International Search Report dated Apr. 25, 2016, 2 pages.
Foreign Communication From a Counterpart Application, International Application No. PCT/CN2016/071596, English Translation of Written Opinion dated Apr. 25, 2016, 5 pages.
Machine Translation and Abstract of Chinese Publication No. CN101018195, Aug. 15, 2007, 12 pages.
Machine Translation and Abstract of Chinese Publication No. CN101056259, Oct. 17, 2007, 10 pages.
Machine Translation and Abstract of Chinese Publication No. CN101119281, Feb. 6, 2008, 20 pages.
Machine Translation and Abstract of Chinese Publication No. CN101640895, Feb. 3, 2010, 24 pages.
Machine Translation and Abstract of Chinese Publication No. CN104506369, Apr. 8, 2015, 45 pages.
Foreign Communication From a Counterpart Application, Chinese Application No. 201510409654.4, Chinese Office Action dated Mar. 27, 2019, 6 pages.
Usach, R., et al., "Implementation and Evaluation of Coupled Congestion Control for Multipath TCP," XP047376005, Aug. 29, 2012, pp. 173-182.
Foreign Communication From a Counterpart Application, European Application No. 16823641.2, Extended European Search Report dated May 9, 2018, 7 pages.

* cited by examiner

CONGESTION CONTROL METHOD AND NETWORK NODE

CROSS-REFERENCE TO RELATED APPLICATIONS

This application is a continuation of International Patent Application No. PCT/CN2016/071596 filed on Jan. 21, 2016, which claims priority to Chinese Patent Application No. 201510409654.4 filed on Jul. 13, 2015, both of which are hereby incorporated by reference in their entireties.

TECHNICAL FIELD

The present disclosure relates to the field of communications technologies, and in particular, to a congestion control method and a network node.

BACKGROUND

To control congestion in a more refined and intelligent manner and even fundamentally avoid a network congestion phenomenon, a router node in a network needs to participate in congestion control. A router detects congestion, examines impact of each flow on the congestion, and manages a queue length in order to control the congestion.

Current queue management mechanisms may be classified into two main types, a passive queue management (PQM) and an active queue management (AQM). In the PQM, a maximum value is set for a data packet queue in a router (by packet), then a packet is allowed to enter the queue till a queue length reaches the maximum value, and a packet that arrives subsequently is dropped, that is, the PQM is a conventional "drop tail" algorithm. In this case, multiple Transmission Control Protocol (TCP) routers detect that a packet loss phenomenon exists in a network, the network is considered to be congested, and then the routers decrease sending rates. Consequently, a slow start is performed on all the TCP routers. In the AQM, congestion is probed by monitoring an average queue length of a router using a random early detection (RED) algorithm. When an average queue length of a router falls within a defined specific threshold range, it indicates that the congestion is imminent. In this case, a source node is selected according to a specific probability to drop a packet to adjust a congestion control window. A packet is actively dropped before a data packet queue of the router is full such that all routers transmit data packets according to a size of the adjusted congestion control window.

It can be learned from the foregoing that in both the PQM and the AQM, a queue status of an individual router is managed to control data packet transmission of routers in an entire network such that congestion is controlled. However, because sending rates of routers in an existing network are different, when an existing congestion control method is used, some network resources that could have been used by the routers may be unavailable to the routers because a slow start is performed on the routers. Consequently, unnecessary network bandwidth waste is caused, and network utilization is reduced.

SUMMARY

Embodiments of the present disclosure provide a congestion control method and a network node in order to resolve problems of network resource waste and network utilization decrease that are caused by an existing congestion control method.

To achieve the foregoing objective, the embodiments of the present disclosure use the following technical solutions.

According to a first aspect, an embodiment of the present disclosure provides a congestion control method, where the method includes obtaining, by a first network node, a current queue buffer status of each of N second network nodes, where N is an integer greater than or equal to 1, the second network node and the first network node are mutually coupled, the current queue buffer status of the second network node is used to indicate a size of a resource that is in the second network node and that is used to transmit a data packet, and that the second network node and the first network node are mutually coupled means that a change of a queue buffer status of the first network node is affected by an action force of the second network node, and the first network node exerts a force on the second network node and affects a change of the queue buffer status of the second network node, combining, by the first network node, current queue buffer statuses of the N second network nodes and the current queue buffer status of the first network node into a state vector, updating, by the first network node, the current queue buffer status of the first network node according to the state vector and a coupling vector, where the coupling vector includes N+1 coefficients, N coefficients in the N+1 coefficients are in a one-to-one correspondence with the N second network nodes, the N coefficients are separately represented by 1 and are used to indicate that there is a coupling relationship between the second network node and the first network node, and one coefficient in the N+1 coefficients except the N coefficients is represented by an additive inverse of a degree of the first network node, and is used to indicate local connectivity of the first network node, and repeating all the above obtaining, combining and updating steps till an absolute value of a difference between each of the queue buffer statuses of the N second network nodes and the queue buffer status of the first network node is less than or equal to a preset threshold.

With reference to the first aspect, in a first implementable manner of the first aspect, updating, by the first network node, the current queue buffer status of the first network node according to the state vector and a coupling vector includes performing first process on the state vector and the coupling vector, where the first process is used to obtain a sum of impact of action forces exerted on the first network node by other network nodes, performing second process on the current queue buffer status of the first network node and a result obtained after the first process, where the second process is used to adjust the current queue buffer status of the first network node, and determining, as an updated queue buffer status of the first network node, a result obtained after the second process.

With reference to the first implementable manner of the first aspect, in a second implementable manner of the first aspect, performing the first process on the state vector and the coupling vector includes multiplying the state vector by the coupling vector, and performing the second process on the current queue buffer status of the first network node and a result obtained after the first process includes adding, to the current queue buffer status of the first network node, a result obtained after the state vector is multiplied by the coupling vector.

With reference to the first implementable manner of the first aspect, in a third implementable manner of the first aspect, performing the first process on the state vector and
} the coupling vector includes multiplying a coupling strength, the state vector, and the coupling vector together, and performing the second process on the current queue buffer status of the first network node and a result obtained after the first process includes adding, to the current queue buffer status of the first network node, a result obtained after the coupling strength, the state vector, and the coupling vector are multiplied together, where the coupling strength is between 0 and 1, and is used to indicate a strength of coupling between the first network node and the second network node.

With reference to any one of the first aspect or the first to the third implementable manners of the first aspect, in a fourth implementable manner of the first aspect, before obtaining the current queue buffer status of each of N second network nodes, the method further includes determining, by the first network node, that the first network node and the second network node are mutually coupled when the second network node and the first network node are connected using a physical link, or discovering, by the first network node using the Open Shortest Path First (OSPF) protocol, that the first network node and the second network node are mutually coupled.

According to a second aspect, an embodiment of the present disclosure provides a network node, including an obtaining unit configured to obtain a current queue buffer status of each of N second network nodes, and combine current queue buffer statuses of the N second network nodes and a current queue buffer status of the network node into a state vector, where N is an integer greater than or equal to 1, the second network node and the network node are mutually coupled, the current queue buffer status of the second network node is used to indicate a size of a resource that is in the second network node and that is used to transmit a data packet, and that the second network node and the network node are mutually coupled means that a change of the queue buffer status of the network node is affected by an action force of the second network node, and the network node exerts a force on the second network node and affects a change of the queue buffer status of the second network node, and a calculation unit configured to update the current queue buffer status of the network node according to the state vector and a coupling vector till an absolute value of a difference between each of the queue buffer statuses of the N second network nodes and the queue buffer status of the network node is less than or equal to a preset threshold, where the coupling vector includes N+1 coefficients, N coefficients in the N+1 coefficients are in a one-to-one correspondence with the N second network nodes, the N coefficients are separately represented by 1 and are used to indicate that there is a coupling relationship between the second network node and the network node, and one coefficient in the N+1 coefficients except the N coefficients is represented by an additive inverse of a degree of the network node, and is used to indicate local connectivity of the network node.

With reference to the second aspect, in a first implementable manner of the second aspect, the calculation unit is further configured to perform first process on the state vector and the coupling vector, where the first process is used to obtain a sum of impact of action forces exerted on the first network node by other network nodes, perform second process on the current queue buffer status of the first network node and a result obtained after the first process, where the second process is used to adjust the current queue buffer status of the first network node, and determine, as an updated queue buffer status of the first network node, a result obtained after the second process.

With reference to the first implementable manner of the second aspect, in a second implementable manner of the second aspect, the calculation unit is further configured to multiply the state vector by the coupling vector, and add, to the current queue buffer status of the first network node, a result obtained after the state vector is multiplied by the coupling vector.

With reference to the first implementable manner of the second aspect, in a third implementable manner of the second aspect, the calculation unit is further configured to multiply a coupling strength, the state vector, and the coupling vector together, and add, to the current queue buffer status of the first network node, a result obtained after the coupling strength, the state vector, and the coupling vector are multiplied together, where the coupling strength is between 0 and 1, and is used to indicate a strength of coupling between the first network node and the second network node.

With reference to any one of the second aspect or the first to the third implementable manners of the second aspect, in a fourth implementable manner of the second aspect, the network node further includes a determining unit configured to determine that the second network node and the first network node are connected using a physical link in order to determine that the first network node and the second network node are mutually coupled before the obtaining unit obtains the current queue buffer status of each of the N second network nodes, or discover, using the OSPF protocol, that the first network node and the second network node are mutually coupled.

It can be learned from the foregoing that according to the congestion control method and the network node provided in the embodiments of the present disclosure, the first network node obtains the current queue buffer status of each of the N second network nodes, combines the current queue buffer statuses of the N second network nodes and the current queue buffer status of the first network node into the state vector, and updates the current queue buffer status of the first network node according to the state vector and the coupling vector till the absolute value of the difference between each of the queue buffer statuses of the N second network nodes and the queue buffer status of the first network node is less than or equal to the preset threshold. In this way, mutual impact between network nodes is considered, and a queue buffer status of each node is adaptively adjusted to a synchronized queue buffer status by means of coupling such that sending rates of the network nodes are equal. Therefore, a network congestion risk is shared, network resource utilization is improved, and the following problem is avoided. When sending rates of network nodes in an existing network system are unequal, some network resources that could have been used by the network nodes cannot be used due to improper congestion control, and consequently unnecessary network bandwidth waste is caused, and network utilization is reduced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

A basic idea of the present disclosure includes introducing a dynamics synchronization theory to the network congestion control field. Before an existing network node congestion control mechanism, such as a PQM or AQM is used, according to coupling between nodes that are connected using a link in a network, statuses (for example, queue lengths and buffer sizes) of all the nodes in the network tend to be consistent after a period of evolution, that is, the statuses of the nodes are synchronized to achieve distributed congestion control, and fundamentally avoid network congestion. The network node may be a network device with a data transferring or receiving function, for example, a router.

Embodiment 1

Figure 1:
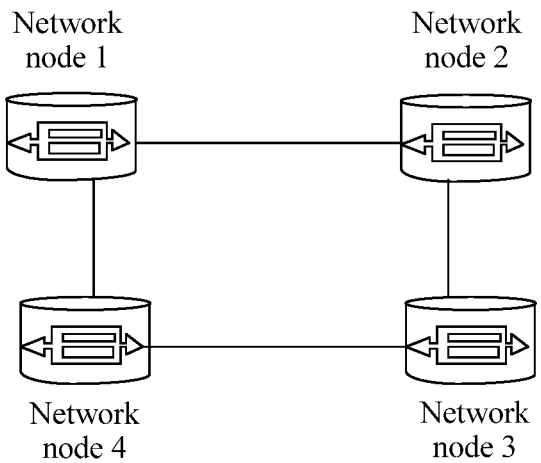
FIG. 1 is a structural diagram of a dynamics network system according to an embodiment of the present disclosure.
Figure 2:
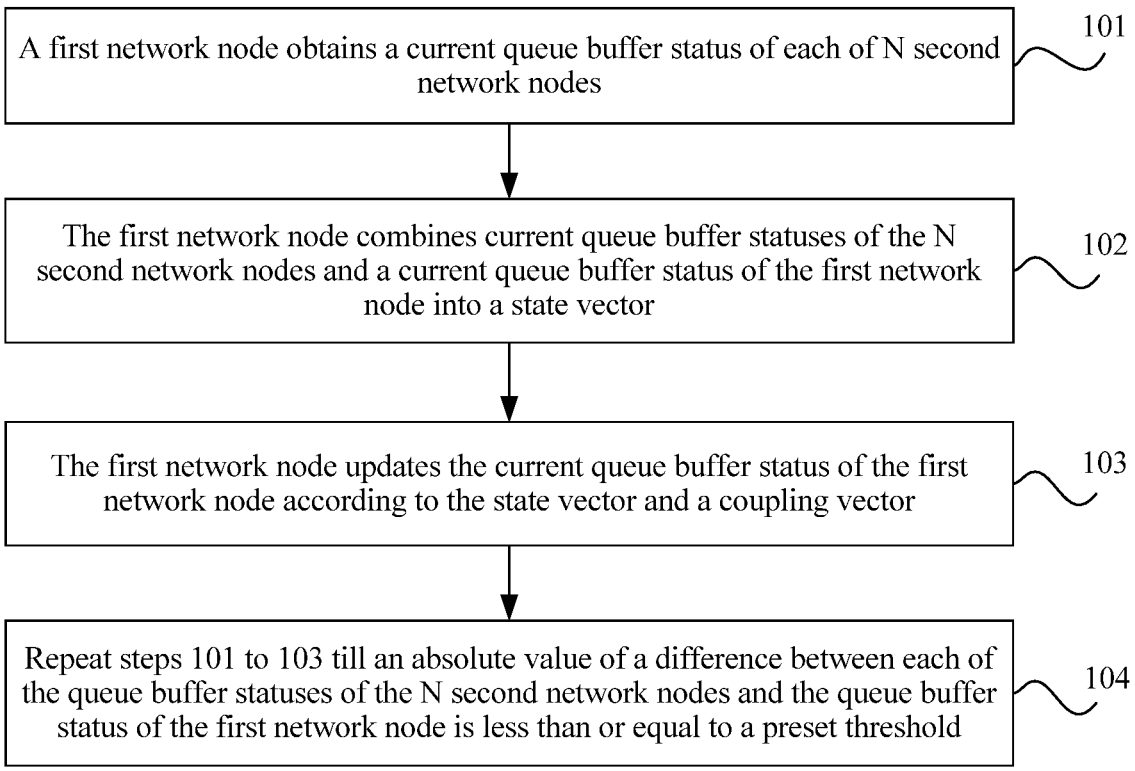
FIG. 2 is a flowchart of a congestion control method according to an embodiment of the present disclosure.

With reference to FIG. 2, the following describes in detail a congestion control method provided in the present disclosure. The congestion control method is applied to each network node in a network system. The network system may include at least one network node, and there is a coupling relationship between network nodes that are connected using a link. For example, the congestion control method may be applied to each node in a network system shown in FIG. 1. The method may include the following steps.

Step 101: A first network node obtains a current queue buffer status of each of N second network nodes.

The first network node may be any network node in a network. The second network node and the first network node are mutually coupled. N is an integer greater than or equal to 1. It should be noted that in a specific application scenario, a total quantity of second network nodes that have a mutual coupling relationship with the first network node may be equal to N or less than N, that is, in this embodiment of the present disclosure, all second network nodes may be considered, or only some of all second network nodes may be considered, and this is not limited herein.

The mutual coupling refers to a phenomenon that two or more individuals in a group affect each other by means of interaction to jointly reinforce each other, or to be simpler, is an action force and a reaction force or a coupling effect between individuals. For example, that the second network node and the first network node are mutually coupled may mean that a change of a queue buffer status of the first network node is affected by an action force of the second network node, and the first network node exerts a force on the second network node and affects a change of the queue buffer status of the second network node.

The current queue buffer status of the second network node is used to indicate a size of a resource that is in the second network node and that is used to transmit a data packet, and may be a queue length, a buffer size, a packet sending rate, or the like of the network node.

Optionally, before the first network node obtains the current queue buffer status of each of the N second network nodes, the first network node may determine, according to whether there is a physical link between the second network node and the first network node, whether the second network node and the first network node are mutually coupled. For example, if the second network node and the first network node are connected using a physical link, it is determined that the second network node and the first network node are mutually coupled, or if there is no physical link between the second network node and the first network node, it is determined that there is no coupling relationship between the second network node and the first network node. Alternatively, a second network node that is coupled to the first network node may be discovered using the OSPF protocol. This is not limited in this embodiment of the present disclosure.

For example, as shown in FIG. 1, the network system includes four network nodes, a network node 1, a network node 2, a network node 3, and a network node 4. The network node 1 is connected to the network node 2 and the network node 4 using physical links, the network node 2 is connected to the network node 1 and the network node 3 using physical links, the network node 3 is connected to the network node 2 and the network node 4 using physical links, and the network node 4 is connected to the network node 1 and the network node 3 using physical links. Therefore, network nodes that are coupled to the network node 1 may be the network node 1, the network node 2, and the network node 4, network nodes that are coupled to the network node 2 may be the network node 1, the network node 2, and the network node 3, network nodes that are coupled to the network node 3 may be the network node 2, the network node 3, and the network node 4, and network nodes that are coupled to the network node 4 may be the network node 1, the network node 3, and the network node 4.

Step 102: The first network node combines current queue buffer statuses of the N second network nodes and a current queue buffer status of the first network node into a state vector.

Step 103: The first network node updates the current queue buffer status of the first network node according to the state vector and a coupling vector.

The coupling vector includes N+1 coefficients, N coefficients in the N+1 coefficients are in a one-to-one correspondence with the N second network nodes, the N coefficients are separately represented by 1 and are used to indicate that there is a coupling relationship between the second network node and the first network node, and one coefficient in the N+1 coefficients except the N coefficients is represented by an additive inverse of a degree of the first network node, and is used to indicate local connectivity of the first network node.

In other words, if a network node i and a network node j are mutually coupled, a coupling relationship between the network node i and the network node j is represented by 1, if a network node i and a network node j are a same network node, a coefficient of coupling between the network node i and the network node j is represented by an additive inverse of a degree of the network node, where the degree of the network node is a quantity of physical links connected to the network node, or if a network node i and a network node j are not mutually coupled, a coupling relationship between the network node i and the network node j is represented by 0. For example, as shown in the following formula, a coupling relationship between an $i^{th}$ network node and a $j^{th}$ network node may be indicated as:

$$G_{ij} = \begin{cases} -k_i & j = i \\ 1 & i = \wedge_i \\ 0 & \text{otherwise} \end{cases},$$

where $k_i$ is a degree of the $i^{th}$ network node, and $\wedge_i$ is a set of network nodes coupled to the network node i.

For example, in the network system shown in FIG. 1, a coupling vector obtained using a coupling relationship between the network node 1 and each of (the network node 1, the network node 2, and the network node 4) is (−2, 1, 1), a coupling vector obtained using a coupling relationship between the network node 2 and each of (the network node 1, the network node 2, and the network node 3) is (1, −2, 1), a coupling vector obtained using a coupling relationship between the network node 3 and each of (the network node 2, the network node 3, and the network node 4) is (1, −2, 1), and a coupling vector obtained using a coupling relationship between the network node 4 and each of (the network node 1, the network node 3, and the network node 4) is (1, 1, −2).

Optionally, when the state vector is a row (column) vector, the coupling vector is a column (row) vector, and if an $i^{th}$ coefficient in the state vector is a current queue buffer status of the network node j, an $i^{th}$ coefficient in the coupling vector is used to indicate a coupling relationship between the first network node and the network node j. For example, if the second coefficient in the state vector is a current queue buffer status of the network node 3, the second coefficient in the coupling vector is used to indicate a coupling relationship between the first network node and the network node 3.

The updating the current queue buffer status of the network node may be increasing or decreasing the current queue buffer status of the network node.

Optionally, that the first network node updates the current queue buffer status of the first network node according to the state vector and the coupling vector may include performing first process on the state vector and the coupling vector, where the first process is used to obtain a sum of impact of action forces exerted on the first network node by other network nodes, performing second process on the current queue buffer status of the first network node and a result obtained after the first process, where the second process is used to adjust the current queue buffer status of the first network node, and determining, as an updated queue buffer status of the first network node, a result obtained after the second process.

Further, performing the first process on the state vector and the coupling vector includes multiplying the state vector by the coupling vector.

Performing the second process on the current queue buffer status of the first network node and a result obtained after the first process includes adding, to the current queue buffer status of the first network node, a result obtained after the state vector is multiplied by the coupling vector. An example is expressed by the following formula:

$$x(t+1)=x(t)+G\times X(t),$$

where x(t+1) is the updated queue buffer status of the first network node, x(t) is the current queue buffer status of the first network node, G is the coupling vector, and X(t) is the state vector and includes the current queue buffer status of the first network node and the current queue buffer status of each network node in the N second network nodes.

Optionally, in this embodiment of the present disclosure, the network node may adjust the current queue buffer status of the network node according to a strength of coupling between network nodes. Performing the first process on the state vector and the coupling vector includes multiplying a coupling strength, the state vector, and the coupling vector together.

Performing the second process on the current queue buffer status of the first network node and a result obtained after the first process includes adding, to the current queue buffer status of the first network node, a result obtained after the coupling strength, the state vector, and the coupling vector are multiplied together. An example is expressed by the following formula:

$$x(t+1)=x(t)+\sigma\times G\times X(t),$$

where x(t+1) is the updated queue buffer status of the first network node, x(t) is the current queue buffer status of the first network node, σ represents the coupling strength and is used to indicate strength of mutual impact and a magnitude of an action force between the first network node and the second network node, where a value of σ may range from 0 to 1, and smaller σ indicates smaller strength of the mutual impact and a smaller action force between the first network node and the second network node, G is the coupling vector, and X(t) is the state vector and includes the current queue buffer status of the first network node and the current queue buffer status of each network node in the N second network nodes.

Step 104: Repeat steps 101 to 103 till an absolute value of a difference between each of the queue buffer statuses of the N second network nodes and the queue buffer status of the first network node is less than or equal to a preset threshold.

The preset threshold may be set according to a requirement, and this is not limited in this embodiment of the present disclosure. That the absolute value of the difference between each of the queue buffer statuses of the N second network nodes and the queue buffer status of the first network node is less than or equal to the preset threshold may indicate that the current queue buffer status of the first network node tends to be consistent with (similar to or the same as) the current queue buffer status of each network node in the N second network nodes. The preset threshold may be set to 0, that is, the queue buffer status of the second network node is the same as the queue buffer status of the first network node.

It should be noted that in this embodiment of the present disclosure, each network node in the network system needs to execute the foregoing method, and queue buffer statuses of all the network nodes in the network system can become synchronous ultimately only in this way in order to implement distributed congestion control of the network nodes.

Figure 3:
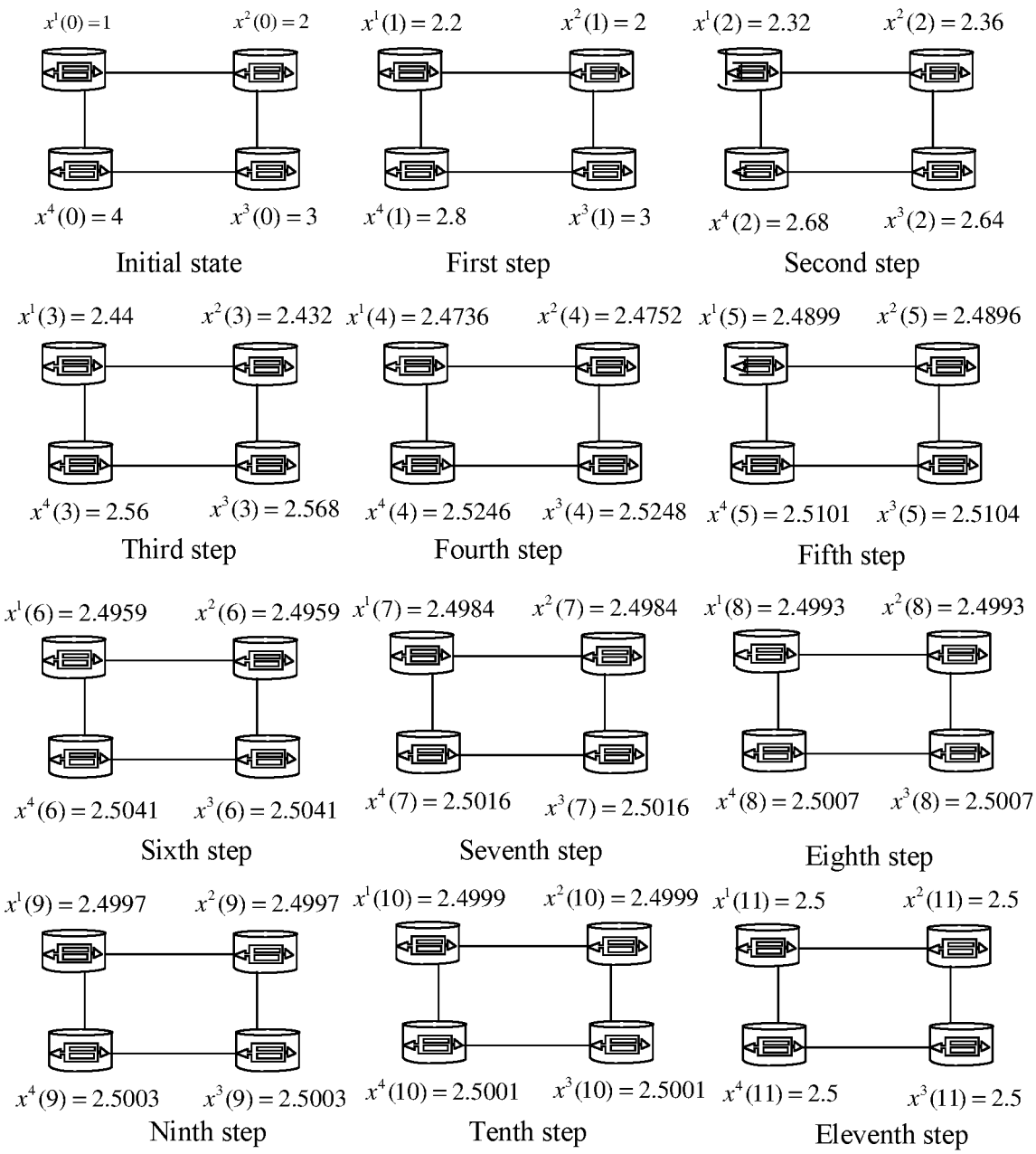
FIG. 3 is a schematic diagram of a congestion control method according to an embodiment of the present disclosure.

For example, FIG. 3 is a schematic diagram of synchronization evolution of queue buffer statuses of all network nodes in the network system shown in FIG. 1 according to the present disclosure. As shown in FIG. 3, it is assumed that an initial queue buffer status of the network node 1 is $x^1(0)=1$, an initial queue buffer status of the network node 2 is $x^2(0)=2$, an initial queue buffer status of the network node 3 is $x^3(0)=3$, an initial queue buffer status of the network node 4 is $x^4(0)=4$, and a coupling strength is 0.3. The following uses a change of a queue buffer status of the network node 1 as an example to describe the foregoing method.

First step: The network node 1 obtains an initial queue buffer status of each of (the network node 1, the network node 2, and the network node 4) to form a state vector (1, 2, 4), and a coupling vector (−2, 1, 1) obtained using a coupling relationship between the network node 1 and each network node, and then obtains an updated queue buffer status of the network node 1 according to the formula $x(t+1)=x(t)+\sigma \times G \times X(t)=1+0.3\times(1, 2, 4)\times(-2, 1, 1)=2.2$.

Second step: The network node 1 obtains a current queue buffer status of each network node in (the network node 1, the network node 2, and the network node 4) to form a state vector (2.2, 2, 2.8), and then obtains an updated queue buffer status of the network node 1 according to the formula $x(t+1)=x(t)+\sigma \times G \times X(t)=2.2+0.3\times(2.2, 2, 2.8)\times(-2, 1, 1)=2.32$.

As shown in FIG. 3, evolution is sequentially performed by performing steps till the $11^{th}$ step of obtaining a current queue buffer status of each network node in (the network node 1, the network node 2, and the network node 4) to form a state vector (2.4999, 2.4999, 2.5001), and obtaining an updated queue buffer status of the network node 1 according to the formula $x(t+1)=x(t)+\sigma \times G \times X(t)=2.4999+0.3\times(2.4999, 2.4999, 2.5001)\times(-2, 1, 1)=2.5$.

When the $12^{th}$ step of coupling is to be performed, it is found that an obtained current queue buffer status of each of (the network node 1, the network node 2, and the network node 4) is 2.5 and is the same as a current queue buffer status of the network node 1, that is, all the network nodes are synchronous. Therefore, the foregoing process ends.

A coupling process of another network node is similar to that of the network node 1, and details are not described herein again.

It can be learned from the foregoing that according to the congestion control method provided in this embodiment of the present disclosure, the first network node obtains the current queue buffer status of each of the N second network nodes, combines the current queue buffer statuses of the N second network nodes and the current queue buffer status of the first network node into the state vector, and updates the current queue buffer status of the first network node according to the state vector and the coupling vector till the absolute value of the difference between each of the queue buffer statuses of the N second network nodes and the queue buffer status of the first network node is less than or equal to the preset threshold. In this way, mutual impact between network nodes is considered, and a queue buffer status of each node is adaptively adjusted to a synchronized queue buffer status by means of coupling such that sending rates of the network nodes are equal. Therefore, a network congestion risk is shared, network resource utilization is improved, and the following problem is avoided. When sending rates of network nodes in an existing network system are unequal, some network resources that could have been used by the network nodes cannot be used due to improper congestion control, and consequently unnecessary network bandwidth waste is caused, and network utilization is reduced.

Embodiment 2

Figure 4A:
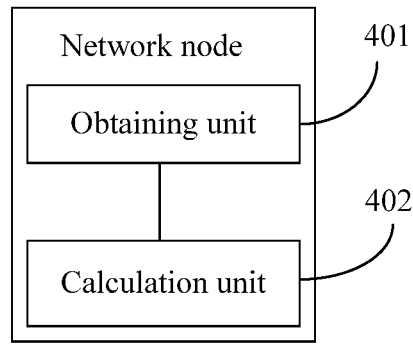
FIG. 4A is a structural diagram of a network node according to an embodiment of the present disclosure.

FIG. 4A shows a network node according to an embodiment of the present disclosure. The network node is configured to execute the method described in Embodiment 1. As shown in FIG. 4A, the network node may include an obtaining unit 401 and a calculation unit 402. The obtaining unit is configured to obtain a current queue buffer status of each of N second network nodes, and combine current queue buffer statuses of the N second network nodes and a current queue buffer status of the network node into a state vector.

The network node may be any network node in a network. The second network node and the network node are mutually coupled. N is an integer greater than or equal to 1. It should be noted that in a specific application scenario, a total quantity of second network nodes that have a mutual coupling relationship with the first network node may be equal to N or less than N, that is, in this embodiment of the present disclosure, all second network nodes may be considered, or only some of all second network nodes may be considered, and this is not limited herein.

The mutual coupling refers to a phenomenon that two or more individuals in a group affect each other by means of interaction to jointly reinforce each other, or to be simpler, is an action force and a reaction force or a coupling effect between individuals. For example, that the second network node and the network node are mutually coupled may mean that a change of the queue buffer status of the network node is affected by an action force of the second network node, and the network node exerts a force on the second network node and affects a change of the queue buffer status of the second network node. A quantity of second network nodes is N, and N is an integer greater than or equal to 1.

The current queue buffer status of the second network node is used to indicate a size of a resource that is in the second network node and that is used to transmit a data packet, and may be a queue length, a buffer size, a packet sending rate, or the like of the network node.

Figure 4B:
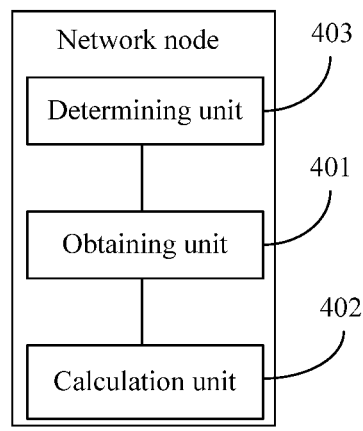
FIG. 4B is a structural diagram of a network node according to an embodiment of the present disclosure.

Optionally, as shown in FIG. 4B with respect to the FIG. 4A, the network node may further include a determining unit 403 configured to determine, according to whether there is a physical link between the second network node and the network node, whether the second network node and the network node are mutually coupled before the obtaining unit 401 obtains the current queue buffer status of each of the N second network nodes. For example, if the second network node and the network node are connected using a physical link, it is determined that the second network node and the network node are mutually coupled, or if there is no physical link between the second network node and the network node, it is determined that there is no coupling relationship between the second network node and the network node. Alternatively, a second network node that is coupled to the network node may be discovered using the OSPF protocol. This is not limited in this embodiment of the present disclosure.

For example, as shown in FIG. 1, the network system includes four network nodes, a network node 1, a network node 2, a network node 3, and a network node 4. The network node 1 is connected to the network node 2 and the network node 4 using physical links, the network node 2 is connected to the network node 1 and the network node 3 using physical links, the network node 3 is connected to the network node 2 and the network node 4 using physical links, and the network node 4 is connected to the network node 1 and the network node 3 using physical links. Therefore, network nodes that are coupled to the network node 1 may be the network node 1, the network node 2, and the network node 4, network nodes that are coupled to the network node 2 may be the network node 1, the network node 2, and the network node 3, network nodes that are coupled to the network node 3 may be the network node 2, the network node 3, and the network node 4, and network nodes that are coupled to the network node 4 may be the network node 1, the network node 3, and the network node 4.

The calculation unit 402 is configured to update the current queue buffer status of the network node according to the state vector and a coupling vector till an absolute value of a difference between each of the queue buffer statuses of the N second network nodes and the queue buffer status of the network node is less than or equal to a preset threshold.

The coupling vector includes N+1 coefficients, N coefficients in the N+1 coefficients are in a one-to-one correspondence with the N second network nodes, the N coefficients are separately represented by 1 and are used to indicate that there is a coupling relationship between the second network node and the network node, and one coefficient in the N+1 coefficients except the N coefficients is represented by an additive inverse of a degree of the network node, and is used to indicate local connectivity of the network node.

The preset threshold may be set according to a requirement, and this is not limited in this embodiment of the present disclosure. That the absolute value of the difference between each of the queue buffer statuses of the N second network nodes and the queue buffer status of the network node is less than or equal to the preset threshold may indicate that the current queue buffer status of the network node tends to be consistent with (similar to or the same as) the current queue buffer status of each network node in the N second network nodes. Preferably, the preset threshold may be set to 0, that is, the queue buffer status of the network node is the same as the queue buffer status of the second network node.

In other words, if a network node i and a network node j are mutually coupled, a coupling relationship between the network node i and the network node j is represented by 1, if a network node i and a network node j are a same network node, a coefficient of coupling between the network node i and the network node j is represented by an additive inverse of a degree of the network node, where the degree of the network node is a quantity of physical links connected to the network node, or if a network node i and a network node j are not mutually coupled, a coupling relationship between the network node i and the network node j is represented by 0. For example, as shown in the following formula, a coupling relationship between an $i^{th}$ network node and a $j^{th}$ network node may be indicated as:

$$G_{ij} = \begin{cases} -k_i & j = i \\ 1 & i = \wedge_i \\ 0 & \text{otherwise} \end{cases},$$

where $k_i$ is a degree of the $i^{th}$ network node, and $\wedge_i$ is a set of network nodes coupled to the network node i.

Optionally, when the state vector is a row (column) vector, the coupling vector is a column (row) vector, and if an $i^{th}$ coefficient in the state vector is a current queue buffer status of the network node j, an $i^{th}$ coefficient in the coupling vector is used to indicate a coupling relationship between the network node and the network node j. For example, if the second coefficient in the state vector is a current queue buffer status of the network node 3, the second coefficient in the coupling vector is used to indicate a coupling relationship between the network node and the network node 3.

The updating the current queue buffer status of the network node may be increasing or decreasing the current queue buffer status of the network node.

Optionally, the calculation unit 402 is further configured to perform first process on the state vector and the coupling vector, where the first process is used to obtain a sum of impact of action forces exerted on the first network node by other network nodes, perform second process on the current queue buffer status of the first network node and a result obtained after the first process, where the second process is used to adjust the current queue buffer status of the first network node, and determine, as an updated queue buffer status of the first network node, a result obtained after the second process.

The first process may be multiplying the state vector by the coupling vector. The second process may be adding, to the current queue buffer status of the first network node, a result obtained after the state vector is multiplied by the coupling vector. An example is expressed by the following formula:

$$x(t+1) = x(t) + G \times X(t),$$

where x(t+1) is the updated queue buffer status of the network node, x(t) is the current queue buffer status of the network node, G is the coupling vector, and X(t) is the state vector and includes the current queue buffer status of the network node and the current queue buffer status of each network node in the N second network nodes.

Optionally, in this embodiment of the present disclosure, alternatively, the network node may adjust the current queue buffer status of the network node according to a strength of coupling between network nodes. The calculation unit 402 may be further configured to multiply a coupling strength, the state vector, and the coupling vector together, add, to the current queue buffer status of the network node, a result obtained after the multiplying, and determine, as the updated queue buffer status of the network node, a queue buffer status obtained after the adding. An example is expressed by the following formula:

$$x(t+1) = x(t) + \sigma \times G \times X(t)$$

x(t+1) is the updated queue buffer status of the network node, x(t) is the current queue buffer status of the network node, σ represents the coupling strength and is used to indicate strength of mutual impact and a magnitude of an action force between the network node and the second network node, where a value of σ may range from 0 to 1, and smaller σ indicates smaller strength of the mutual impact and a smaller action force between the network node and the second network node, G is the coupling vector, and X(t) is the state vector and includes the current queue buffer status of the network node and the current queue buffer status of each network node in the N second network nodes.

It should be noted that in this embodiment of the present disclosure, each network node in the network system needs to include a structure of the network node described in Embodiment 2, and queue buffer statuses of all the network nodes in the network system can become synchronous ultimately only in this way in order to implement distributed congestion control of the network nodes.

It can be learned from the foregoing that, the network node provided in this embodiment of the present disclosure obtains the current queue buffer status of each of the N second network nodes, combines the current queue buffer statuses of the N second network nodes and the current queue buffer status of the network node into the state vector, and updates the current queue buffer status of the network node according to the state vector and the coupling vector till the absolute value of the difference between each of the queue buffer statuses of the N second network nodes and the queue buffer status of the network node is less than or equal to the preset threshold. In this way, mutual impact between network nodes is considered, and a queue buffer status of each node is adaptively adjusted to a synchronized queue buffer status by means of coupling such that sending rates of the network nodes are equal. Therefore, a network congestion risk is shared, network resource utilization is improved, and the following problem is avoided. When sending rates of network nodes in an existing network system are unequal, some network resources that could have been used by the network nodes cannot be used due to improper congestion control, and consequently unnecessary network bandwidth waste is caused, and network utilization is reduced.

Embodiment 3

Figure 5:
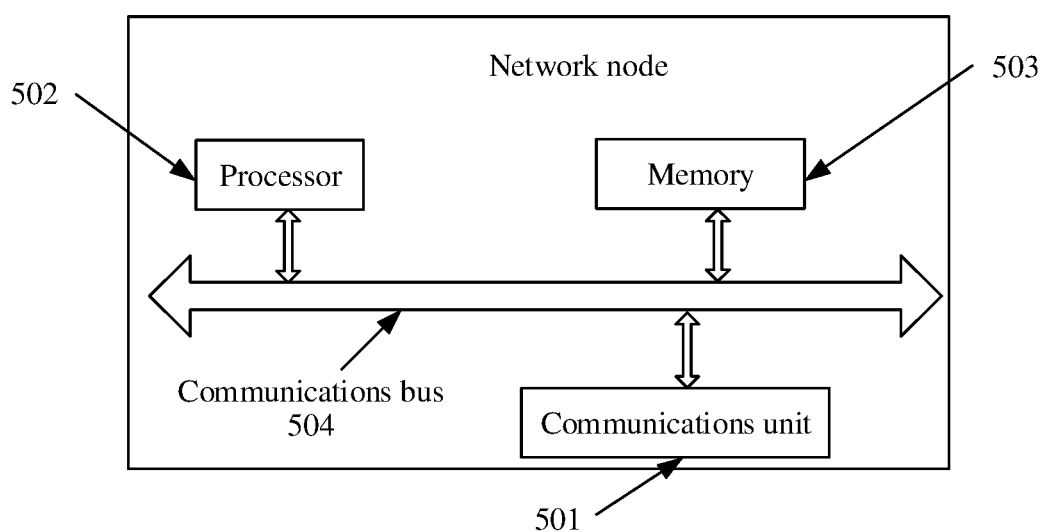
FIG. 5 is a structural diagram of a network node according to an embodiment of the present disclosure.

FIG. 5 shows a network node according to an embodiment of the present disclosure. The network node is configured to execute the method described in Embodiment 1. As shown in FIG. 5, the network node may include a communications unit 501, a processor 502, a memory 503, and at least one communications bus 504 that is configured to implement connections and mutual communication between these apparatuses.

The communications unit 501 is configured to perform data transmission with an external network element.

The processor 502 may be a central processing unit (CPU).

The memory 503 may be a volatile memory, such as a random access memory (RAM), or a non-volatile memory such as a read-only memory (ROM), a flash memory, a hard disk drive (HDD), a solid-state drive (SSD), or a combination of the foregoing types of memories, and provides an instruction and data for the processor 502.

The communications unit 501 is configured to obtain a current queue buffer status of each of N second network nodes.

The network node may be any network node in a network. The second network node and the network node are mutually coupled. N is an integer greater than or equal to 1. It should be noted that in a specific application scenario, a total quantity of second network nodes that have a mutual coupling relationship with the first network node may be equal to N or less than N, that is, in this embodiment of the present disclosure, all second network nodes may be considered, or only some of all second network nodes may be considered, and this is not limited herein.

The mutual coupling refers to a phenomenon that two or more individuals in a group affect each other by means of interaction to jointly reinforce each other, or to be simpler, is an action force and a reaction force or a coupling effect between individuals. For example, that the second network node and the network node are mutually coupled may mean that a change of a queue buffer status of the network node is affected by an action force of the second network node, and the network node exerts a force on the second network node and affects a change of the queue buffer status of the second network node. A quantity of second network nodes is N, and N is an integer greater than or equal to 1.

The current queue buffer status of the second network node is used to indicate a size of a resource that is in the second network node and that is used to transmit a data packet, and may be a queue length, a buffer size, a packet sending rate, or the like of the network node.

Optionally, before the communications unit 501 obtains the current queue buffer status of each of the N second network nodes, the processor 502 may determine, according to whether there is a physical link between the second network node and the network node, whether the second network node and the network node are mutually coupled. For example, if the second network node and the network node are connected using a physical link, it is determined that the second network node and the network node are mutually coupled, or if there is no physical link between the second network node and the network node, it is determined that there is no coupling relationship between the second network node and the network node. Alternatively, a second network node that is coupled to the network node may be discovered using the OSPF protocol. This is not limited in this embodiment of the present disclosure.

For example, as shown in FIG. 1, the network system includes four network nodes, a network node 1, a network node 2, a network node 3, and a network node 4. The network node 1 is connected to the network node 2 and the network node 4 using physical links, the network node 2 is connected to the network node 1 and the network node 3 using physical links, the network node 3 is connected to the network node 2 and the network node 4 using physical links, and the network node 4 is connected to the network node 1 and the network node 3 using physical links. Therefore, network nodes that are coupled to the network node 1 may be the network node 1, the network node 2, and the network node 4, network nodes that are coupled to the network node 2 may be the network node 1, the network node 2, and the network node 3, network nodes that are coupled to the network node 3 may be the network node 2, the network node 3, and the network node 4, and network nodes that are coupled to the network node 4 may be the network node 1, the network node 3, and the network node 4.

The processor 502 is configured to combine current queue buffer statuses of the N second network nodes and a current queue buffer status of the network node into a state vector, and update the current queue buffer status of the network node according to the state vector and a coupling vector till an absolute value of a difference between each of the queue buffer statuses of the N second network nodes and the queue buffer status of the network node is less than or equal to a preset threshold.

The coupling vector includes N+1 coefficients, N coefficients in the N+1 coefficients are in a one-to-one correspondence with the N second network nodes, the N coefficients are separately represented by 1 and are used to indicate that there is a coupling relationship between the second network node and the network node, and one coefficient in the N+1 coefficients except the N coefficients is represented by an additive inverse of a degree of the network node, and is used to indicate local connectivity of the network node.

The preset threshold may be set according to a requirement, and this is not limited in this embodiment of the present disclosure. That the absolute value of the difference between each of the queue buffer statuses of the N second network nodes and the queue buffer status of the network node is less than or equal to the preset threshold may indicate that the current queue buffer status of the network node tends to be consistent with (similar to or the same as) the current queue buffer status of each network node in the N second network nodes. Preferably, the preset threshold may be set to 0, that is, the queue buffer status of the network node is the same as the queue buffer status of the network node.

In other words, if a network node i and a network node j are mutually coupled, a coupling relationship between the network node i and the network node j is represented by 1, if a network node i and a network node j are a same network node, a coefficient of coupling between the network node i and the network node j is represented by an additive inverse of a degree of the network node, where the degree of the network node is a quantity of physical links connected to the network node, or if a network node i and a network node j are not mutually coupled, a coupling relationship between the network node i and the network node j is represented by 0. For example, as shown in the following formula, a coupling relationship between an $i^{th}$ network node and a $j^{th}$ network node may be indicated as:

$$G_{ij} = \begin{cases} -k_i & j = i \\ 1 & i = \wedge_i \\ 0 & \text{otherwise} \end{cases},$$

where $k_i$ is a degree of the $i^{th}$ network node, and $\wedge_i$ is a set of network nodes coupled to the network node i.

Optionally, when the state vector is a row (column) vector, the coupling vector is a column (row) vector, and if an $i^{th}$ coefficient in the state vector is a current queue buffer status of the network node j, an $i^{th}$ coefficient in the coupling vector is used to indicate a coupling relationship between the network node and the network node j. For example, if the second coefficient in the state vector is a current queue buffer status of the network node 3, the second coefficient in the coupling vector is used to indicate a coupling relationship between the network node and the network node 3.

The updating the current queue buffer status of the network node may be increasing or decreasing the current queue buffer status of the network node.

Optionally, the processor 502 is further configured to perform first process on the state vector and the coupling vector, where the first process is used to obtain a sum of impact of action forces exerted on the first network node by other network nodes, perform second process on the current queue buffer status of the first network node and a result obtained after the first process, where the second process is used to adjust the current queue buffer status of the first network node, and determine, as an updated queue buffer status of the first network node, a result obtained after the second process.

The first process may be multiplying the state vector by the coupling vector. The second process may be further adding, to the current queue buffer status of the first network node, a result obtained after the state vector is multiplied by the coupling vector. An example is expressed by the following formula:

$$x(t+1)=x(t)+G\times X(t),$$

where x(t+1) is the updated queue buffer status of the network node, x(t) is the current queue buffer status of the network node, G is the coupling vector, and X(t) is the state vector and includes the current queue buffer status of the network node and the current queue buffer status of each network node in the N second network nodes.

Optionally, in this embodiment of the present disclosure, alternatively, the network node may adjust the current queue buffer status of the network node according to a strength of coupling between network nodes. The processor 502 may be further configured to multiply a coupling strength, the state vector, and the coupling vector together, add, to the current queue buffer status of the network node, a result obtained after the multiplying, and determine, as the updated queue buffer status of the network node, a queue buffer status obtained after the adding. An example is expressed by the following formula:

$$x(t+1)=x(t)+\sigma \times G \times X(t),$$

where x(t+1) is the updated queue buffer status of the network node, x(t) is the current queue buffer status of the network node, σ represents the coupling strength and is used to indicate strength of mutual impact and a magnitude of an action force between the network node and the second network node, where a value of σ may range from 0 to 1, and smaller σ indicates smaller strength of the mutual impact and a smaller action force between the network node and the second network node, G is the coupling vector, and X(t) is the state vector and includes the current queue buffer status of the network node and the current queue buffer status of each network node in the N second network nodes.

It should be noted that in this embodiment of the present disclosure, each network node in the network system needs to include a structure of the network node described in Embodiment 2, and queue buffer statuses of all the network nodes in the network system can become synchronous ultimately only in this way in order to implement distributed congestion control of the network nodes.

It can be learned from the foregoing that, the network node provided in this embodiment of the present disclosure obtains the current queue buffer status of each of the N second network nodes, combines the current queue buffer statuses of the N second network nodes and the current queue buffer status of the network node into the state vector, and updates the current queue buffer status of the network node according to the state vector and the coupling vector till the absolute value of the difference between each of the queue buffer statuses of the N second network nodes and the queue buffer status of the network node is less than or equal to the preset threshold. In this way, mutual impact between network nodes is considered, and a queue buffer status of each node is adaptively adjusted to a synchronized queue buffer status by means of coupling such that sending rates of the network nodes are equal. Therefore, a network congestion risk is shared, network resource utilization is improved, and the following problem is avoided When sending rates of network nodes in an existing network system are unequal, some network resources that could have been used by the network nodes cannot be used due to improper congestion control, and consequently unnecessary network bandwidth waste is caused, and network utilization is reduced.

It may be clearly understood by persons skilled in the art that, for the purpose of convenient and brief description, for a detailed working process of the foregoing unit and system, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the network nodes or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

Persons of ordinary skill in the art may understand that all or some of the steps of the methods in the embodiments may be implemented by a program instructing relevant hardware. The program may be stored in a computer readable storage medium. The storage medium may include a ROM, a RAM, a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A congestion control method, comprising:
obtaining, by a first network node, a current queue buffer status of each of N second network nodes, wherein N is an integer greater than or equal to one, wherein a second network node and the first network node are mutually coupled, wherein a current queue buffer status of the second network node indicates a size of a resource that is in the second network node and that is used to transmit a data packet, wherein that the second network node and the first network node are mutually coupled indicates a change of a queue buffer status of the first network node is affected by an action force of the second network node, and wherein the first network node exerts a force on the second network node and affects a change of a queue buffer status of the second network node;
combining, by the first network node, current queue buffer statuses of the N second network nodes and a current queue buffer status of the first network node into a state vector;
updating, by the first network node, the current queue buffer status of the first network node according to the state vector and a coupling vector, wherein the coupling vector comprises N+1 coefficients, wherein N coefficients in the N+1 coefficients are in a one-to-one correspondence with the N second network nodes, wherein the N coefficients are separately represented by one, wherein a coefficient of one indicates that there is a coupling relationship between the second network node and the first network node, and wherein one coefficient in the N+1 coefficients except the N coefficients is represented by an additive inverse of a degree of the first network node and indicates local connectivity of the first network node; and
repeating, by the first network node, obtaining the current queue buffer status of each of the N second network nodes, combining the current queue buffer statuses of the N second network nodes and the current queue buffer status of the first network node into the state vector, and updating the current queue buffer status of the first network node, till an absolute value of a difference between each of queue buffer statuses of the N second network nodes and the queue buffer status of the first network node is less than or equal to a preset threshold.

2. The method according to claim 1, wherein updating the current queue buffer status of the first network node comprises:
performing first processing on the state vector and the coupling vector, wherein the first processing is used to obtain a sum of impact of action forces exerted on the first network node by other network nodes;
performing second processing on the current queue buffer status of the first network node and a result obtained after the first processing, wherein the second processing adjusts the current queue buffer status of the first network node; and
determining, as an updated queue buffer status of the first network node, a result obtained after the second processing.

3. The method according to claim 2, wherein performing the first processing on the state vector and the coupling vector comprises multiplying the state vector by the coupling vector, and wherein performing the second processing on the current queue buffer status of the first network node and the result obtained after the first processing comprises adding, to the current queue buffer status of the first network node, a result obtained after the state vector is multiplied by the coupling vector.

4. The method according to claim 2, wherein performing the first processing on the state vector and the coupling vector comprises multiplying a coupling strength, the state vector, and the coupling vector together, wherein performing the second processing on the current queue buffer status of the first network node and the result obtained after the first processing comprises adding, to the current queue buffer status of the first network node, a result obtained after the coupling strength, the state vector, and the coupling vector are multiplied together, wherein a range of the coupling strength comprises between zero and one, and wherein the coupling strength indicates a strength of coupling between the first network node and the second network node.

5. The method according to claim 1, wherein before obtaining the current queue buffer status of each of the N second network nodes, the method further comprises determining, by the first network node, that the first network node and the second network node are mutually coupled when the second network node and the first network node are connected using a physical link.

6. The method according to claim 1, wherein before obtaining the current queue buffer status of each of the N second network nodes, the method further comprises discovering, by the first network node using Open Shortest Path First (OSPF) protocol, that the first network node and the second network node are mutually coupled.

7. A network node, comprising:
a memory comprising instructions; and
a processor coupled to the memory, wherein the instructions cause the processor to be configured to:
obtain a current queue buffer status of each of N second network nodes;
combine the current queue buffer statuses of the N second network nodes and a current queue buffer status of the network node into a state vector, wherein N is an integer greater than or equal to one, wherein a second network node and the network node are mutually coupled, wherein a current queue buffer status of the second network node indicates a size of a resource that is in the second network node and that is used to transmit a data packet, wherein that the second network node and the network node are mutually coupled indicates a change of a queue buffer status of the network node is affected by an action force of the second network node, and wherein the network node exerts a force on the second network node and affects a change of a queue buffer status of the second network node; and
update the current queue buffer status of the network node according to the state vector and a coupling vector till an absolute value of a difference between each of queue buffer statuses of the N second network nodes and the queue buffer status of the network node is less than or equal to a preset threshold, wherein the coupling vector comprises N+1 coefficients, wherein N coefficients in the N+1 coefficients are in a one-to-one correspondence with the N second network nodes, wherein the N coefficients are separately represented by one, wherein a coefficient of one indicates that there is a coupling relationship between the second network node and the network node, and wherein one coefficient in the N+1 coefficients except the N coefficients is represented by an additive inverse of a degree of the network node and indicates local connectivity of the network node.

8. The network node according to claim 7, wherein the instructions further cause the processor to be configured to:
perform first processing on the state vector and the coupling vector, wherein the first processing obtains a sum of impact of action forces exerted on the network node by other network nodes;
perform second processing on the current queue buffer status of the network node and a result obtained after the first processing, wherein the second processing adjusts the current queue buffer status of the network node; and
determine, as an updated queue buffer status of the network node, a result obtained after the second processing.

9. The network node according to claim 8, wherein the instructions further cause the processor to be configured to:
multiply the state vector by the coupling vector; and
add, to the current queue buffer status of the network node, a result obtained after the state vector is multiplied by the coupling vector.

10. The network node according to claim 8, wherein the instructions further cause the processor to be configured to:
multiply a coupling strength, the state vector, and the coupling vector together; and
add, to the current queue buffer status of the network node, a result obtained after the coupling strength, the state vector, and the coupling vector are multiplied together, wherein a range of the coupling strength comprises between zero and one, and wherein the coupling strength indicates a strength of coupling between the network node and the second network node.

11. The network node according to claim 7, wherein before obtaining the current queue buffer status of each of the N second network nodes, the instructions further cause the processor to be configured to determine that the second network node and the network node are connected using a physical link in order to determine that the network node and the second network node are mutually coupled.

12. The network node according to claim 7, wherein the instructions further cause the processor to be configured to discover, using Open Shortest Path First (OSPF) protocol, that the network node and the second network node are mutually coupled.

13. A computer program product comprising a non-transitory computer readable storage medium storing program code thereon for congestion control, the program code comprising instructions for executing a method that comprises:
obtaining, by a first network node, a current queue buffer status of each of N second network nodes, wherein N is an integer greater than or equal to one, wherein a second network node and the first network node are mutually coupled, wherein a current queue buffer status of the second network node indicates a size of a resource in the second network node transmitting a data packet, wherein that the second network node and the first network node are mutually coupled indicates a change of a queue buffer status of the first network node is affected by an action force of the second network node, and wherein the first network node exerts a force on the second network node and affects a change of a queue buffer status of the second network node;
combining, by the first network node, current queue buffer statuses of the N second network nodes and a current queue buffer status of the first network node into a state vector;
updating, by the first network node, the current queue buffer status of the first network node according to the state vector and a coupling vector, wherein the coupling vector comprises N+1 coefficients, wherein N coefficients in the N+1 coefficients are in a one-to-one correspondence with the N second network nodes, wherein the N coefficients are separately represented by one, wherein a coefficient of one indicates that there is a coupling relationship between the second network node and the first network node, and wherein one coefficient in the N+1 coefficients except the N coefficients is represented by an additive inverse of a degree of the first network node and indicates local connectivity of the first network node; and
repeating, by the first network node, obtaining the current queue buffer status of each of the N second network nodes, combining the current queue buffer statuses of the N second network nodes and the current queue buffer status of the first network node into the state vector and updating the current queue buffer status of the first network node, till an absolute value of a difference between each of queue buffer statuses of the N second network nodes and the queue buffer status of the first network node is less than or equal to a preset threshold.

14. The computer program product according to claim 13, wherein updating the current queue buffer status of the first network node comprises:
   performing first processing on the state vector and the coupling vector, wherein the first processing obtains a sum of impact of action forces exerted on the first network node by other network nodes;
   performing second processing on the current queue buffer status of the first network node and a result obtained after the first processing, wherein the second processing adjusts the current queue buffer status of the first network node; and
   determining, as an updated queue buffer status of the first network node, a result obtained after the second processing.

15. The computer program product according to claim 14, wherein performing the first processing on the state vector and the coupling vector comprises multiplying the state vector by the coupling vector, and wherein performing the second processing on the current queue buffer status of the first network node and the result obtained after the first processing comprises adding, to the current queue buffer status of the first network node, a result obtained after the state vector is multiplied by the coupling vector.

16. The computer program product according to claim 14, wherein performing the first processing on the state vector and the coupling vector comprises multiplying a coupling strength, the state vector, and the coupling vector together, wherein performing the second processing on the current queue buffer status of the first network node and the result obtained after the first processing comprises adding, to the current queue buffer status of the first network node, a result obtained after the coupling strength, the state vector, and the coupling vector are multiplied together, wherein a range of the coupling strength comprises between zero and one, and wherein the coupling strength indicates a strength of coupling between the first network node and the second network node.

17. The computer program product according to claim 13, wherein before obtaining the current queue buffer status of each of the N second network nodes, the method further comprises determining, by the first network node, that the first network node and the second network node are mutually coupled when the second network node and the first network node are connected using a physical link.

18. The computer program product according to claim 13, wherein before obtaining the current queue buffer status of each of the N second network nodes, the method further comprises discovering, by the first network node using Open Shortest Path First (OSPF) protocol, that the first network node and the second network node are mutually coupled.

\* \* \* \* \*